UNITED STATES PATENT OFFICE.

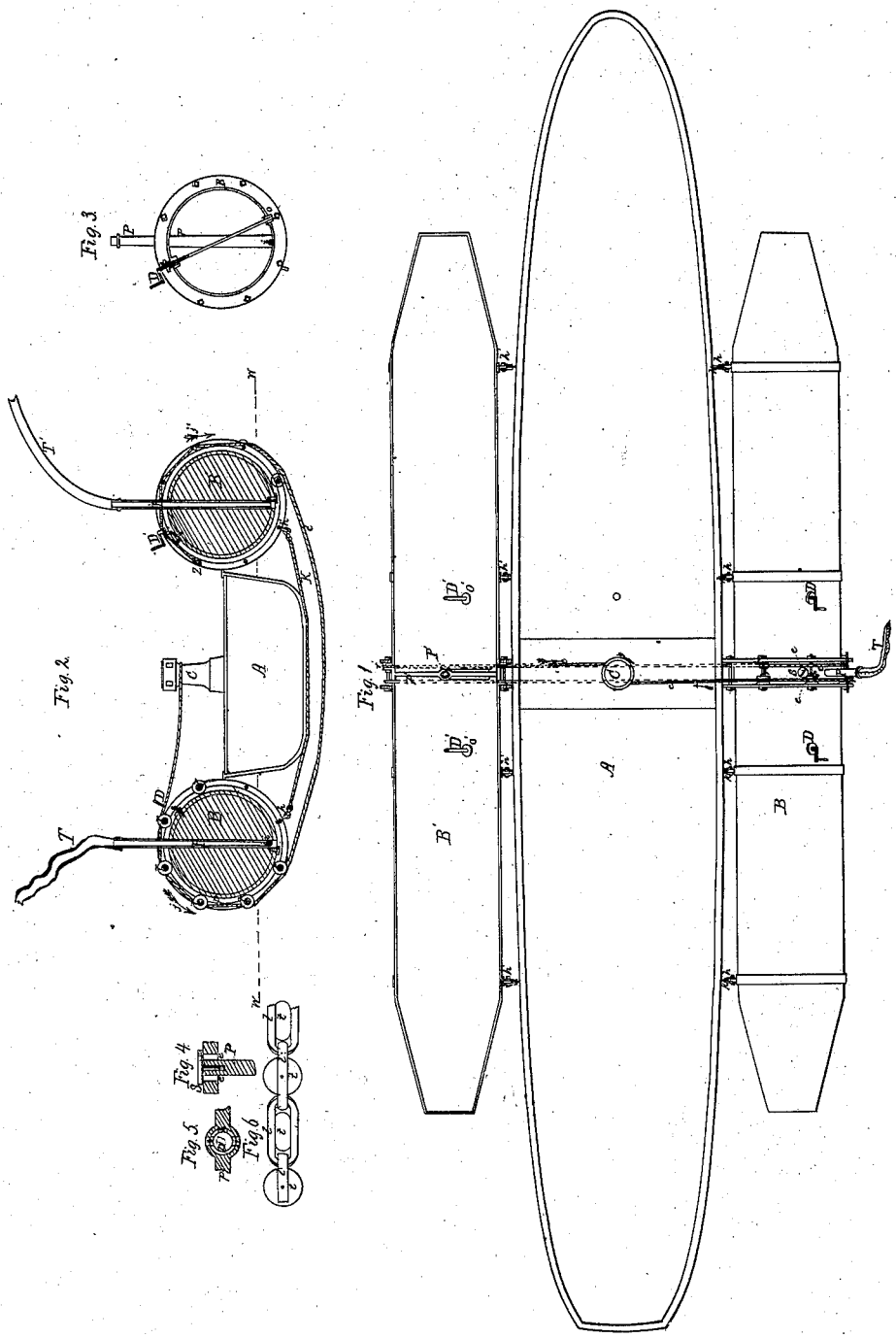
O. T. Williams.
Floating Dock.
N° 8,765.    Patented Feb. 24, 1852.

ORRILLUS T. WILLIAMS, OF SMITHLAND, KENTUCKY.

FLOATING DOCK.

Specification of Letters Patent No. 8,765, dated February 24, 1852.

*To all whom it may concern:*

Be it known that I, ORRILLUS T. WILLIAMS, of Smithland, Livingston county, and State of Kentucky, have invented a new and useful Floating Dock; and I do hereby declare the following to be a full, clear, and exact description thereof, reference being had to the accompanying drawings, which make part of this specification.

My floating dock is composed mainly of two or more cylindrical or prismatic vessels of wood, iron, or other suitable material, made air and water tight, placed at such distance apart as to allow the vessel which is to be lifted or docked, to come between them. When more than one pair of cylinders or prisms are used, they are placed end to end,—one pair toward the head, and another toward the stern of the vessel, thus constituting a dock in sections. Between each pair of cylinders are flexible cross supports, which may be either chains, ropes, bands or the like, and on which the weight of the vessel may be sustained. The number of such supports distributed along the cylinders may vary with the weight to be raised and the other requirements of each case. The ends of the cylinders may be tapered to give them a form favorable for being towed through the water, as my dock is intended not only to raise and support a vessel above the water, but also to convey her from point to point when necessary.

To each of the cylinders or prismatic vessels is attached a flexible tube or air conductor, through which, by means of any suitable forcing pump, air may be injected into said cylinders either when floating upon, or immersed in, the water, thereby displacing the water they may contain, and giving buoyancy or lifting power to the cylinders when required.

To adjust the amount of lifting power to the weight required to be lifted by each end of the cylinder, a partition or diaphragm is inserted, crosswise of the cylinder, (and more than one may be so inserted when necessary;) so as to permit some water to be retained in one part of the cylinder more than in another, and also to prevent the flowing of water from one end to the other of the cylinder. Within the diaphragm, or in a swelled part of it works a pipe connected externally with the flexible tube that conveys air to the cylinder as above described. This pipe is made capable of turning around on its axis, like a stop-cock. It has suitable openings or passages for the injected air, made to correspond to other openings in the sides of the diaphragm in which it works, so arranged that by turning the pipe into different positions it shall throw the injected air into one or the other compartment of the cylinder at pleasure or into both at the same time.

The flexible tube will be connected with any convenient air pump suitable to inject air into the cylinder, expel the water and thereby give buoyancy to the machine. The flexibility of the tube enables it to be twisted sufficiently to turn the pipe for changing the direction of the current and this operation I perform when the elevator is either partly or wholly immersed in water.

In the bottom of each compartment of the cylinder is a passage for the entrance and exit of water, capable however of being closed water tight when required. In the top of each compartment is an aperture to let out air when required in order to depress or sink the cylinders, or to relieve them from the pressure of condensed air on arriving at the surface of the water. These apertures are furnished with the means of closing them air tight. When the dock has come to its greatest height above the water the valve at bottom is closed and the air passage at top is opened to let out the excess pressure above that of the atmosphere.

Each cylinder is furnished with means whereby it may be caused to revolve on its axis, thereby producing the final elevation of the vessel above the surface of the water, the revolution being effected in such a manner that the upper part of each cylinder moves outward from the side of the vessel to be lifted, thereby bringing the points of attachment or of contact between the cylinders and the flexible support which bears the vessel, to the upper side of the cylinders, depressing the latter into the water, while the vessel between them rises above it.

The two cylinders may be made to revolve separately and by the action of distinct machines, or both may be made to revolve simultaneously by the action of one and the same machine which latter method I prefer when it can be applied, because the elevation will in that case be more certainly kept equable on the two sides of the vessel.

In the accompanying drawings, I have exhibited a manner of effecting this simultaneous revolving of the two cylinders.

The flexible supports for sustaining the vessel are intended to pass either under the bottom of the vessel, or (in the case of vessels sunken and not affording access beneath the bottom,) to go through the sides and from side to side thereby obtaining such a hold as will in the first instance enable me to raise her from the bottom for the purpose of placing other flexible supports beneath it on which the docking may then take place, as herein described. The cylinders in this case serve the purpose of elevators first, and of a dock afterward, thus combining the useful properties of the two machines together with the powers of floating or being towed with their load whether they have raised it wholly or in part only above the surface of the water.

In the accompanying drawing Figure 1. exhibits in plan, the vessel A intended to be docked, the cylinder B also in plan and the cylinder B′ in horizontal section. It also exhibits the injection pipe P, with the flexible tube T attached thereto. D D are cranks turning a valve rod working with a screwed stuffing box to open and close the valves as seen at o′ o′ in the cylinder B′. p′ is the diaphragm in a swelled part of which works the pipe P′, opening or closing the apertures i, i, i′ (as seen in section in Fig. 5.) h, h, h, h h′ h′ h′ h′, are the attachments of the cylinders B and B′ to each other through the flexible supports k, k, k, k. On the same figure (1) is seen the capstan C acting on the two cords c and c′ which cause the two cylinders B and B′ to revolve on their respective axes, the directions in which the two cords are drawn being indicated by the arrows. The cord c′ is attached at z to the cylinder B and the cord c in a similar manner is supposed to be attached to the cylinder B′. c′ is seen to pass over the pulley or friction roller r′ and the cord c over the friction rollers r, r, r. At S is a screw having a broad head and elastic washer capable of closing air tight the two vents e, e, the opening of which allows air to escape when the cylinder is to be depressed or sunk in the water. These apertures e, e, are one on one side, and the other on the other side of the partition p. (Fig. 4.)

Fig. 2, is a cross section through the two cylinders, and the vessel to be raised. The same letters apply to the same parts as in Fig. 1, but the arrows j, j′, here indicate the direction in which the two cylinders respectively turn on their axes when docking the vessel.

Fig. 3 is a section of one of the cylinders through the valve D and aperture O exhibiting in elevation the partition p and pipe P.

Fig. 6 is a form of chain in each link of which l, l, l, l, is a friction roller t, t, t, t, inserted, enabling the chain to traverse the outside of the cylinders, without the necessity of their being furnished with stationary friction rollers r, r, &c., over which the cord c′ is represented as passing in Fig. 2.

The rope or chain c, or c′ by which the cylinder is turned around is termed a parbuckle and I call the arrangement by which I effect this simultaneous revolution of both cylinders, a double parbuckle.

Having thus described my dock and the various uses to which it is applicable I will state that I do not claim forcing air into a vessel immersed or partly immersed in water for the purpose of rendering it buoyant, or of admitting water for the purpose of allowing it to sink; but

What I do claim as my invention and desire to secure by Letters Patent is—

1. So forming a cylindric or prismatic dock as to perform the operation of elevating a vessel above the surface, by combining the buoyancy obtained by injecting air, into the cylinders, with the forced revolution of the cylinders on their axes while lying on the water, substantially as herein set forth.

2. I also claim making the rigid, submerged elevator in such a manner as to be actuated by compressed air, only so long as to get rid of the contained water, and to be freed from the interior pressure while sustaining its load above the surface of the water, whereby the liability to accident from the escape of air under high pressure, is avoided substantially as herein described.

3. I also claim in combination with a flexible tube for conveying injected air, the use of the revolving pipe directly connected therewith, whereby the pipe may be turned as herein described for varying the direction of the current of injected air, by turning the flexible tube.

4. I also claim in combination with the flexible tube for the injection of air, the opening in the bottom of the cylinder, and the vents in its top whereby the dock is rendered buoyant while wholly immersed in water and freed from interior pressure on rising to its maximum height on its surface substantially as herein set forth.

5. I also claim, the double parbuckle (c, c′,) or analogous turning apparatus, whether a rope or a chain with friction rollers in its links, (Fig. 6), be used for the purpose of turning the opposite elevator (B, B′) in opposite directions for the purpose of raising the vessel above the water in the manner substantially as herein set forth.

ORRILLUS T. WILLIAMS.

Witnesses:
A. W. CARMONY,
PRESLEY W. DORSEY.